United States Patent
Yeh et al.

(10) Patent No.: US 10,434,571 B2
(45) Date of Patent: Oct. 8, 2019

(54) POWDER INJECTION MOLDING FEEDSTOCK AND METHOD FOR MANUFACTURING THE SAME

(71) Applicant: CHAMP TECH OPTICAL (FOSHAN) CORPORATION, Foshan (CN)

(72) Inventors: Dung-Chang Yeh, New Taipei (TW); Lei Yan, Foshan (CN); Ru-Jie Huang, Guangdong (CN)

(73) Assignee: CHAMP TECH OPTICAL (FOSHAN) CORPORATION, Foshan (CN)

(*) Notice: Subject to any disclaimer, the term of this patent is extended or adjusted under 35 U.S.C. 154(b) by 27 days.

(21) Appl. No.: 15/794,338

(22) Filed: Oct. 26, 2017

(65) Prior Publication Data
US 2019/0039132 A1    Feb. 7, 2019

(30) Foreign Application Priority Data
Aug. 3, 2017 (CN) .......................... 2017 1 0657505

(51) Int. Cl.
*B22F 1/00* (2006.01)
*B22F 3/22* (2006.01)

(52) U.S. Cl.
CPC ............ *B22F 1/0062* (2013.01); *B22F 3/225* (2013.01)

(58) Field of Classification Search
CPC ...... B22F 1/0062; B22F 3/225; B22F 1/0077; B22F 1/0003; B22F 1/0059; B22F 9/04
USPC .......................................................... 419/36
See application file for complete search history.

(56) References Cited

U.S. PATENT DOCUMENTS

2017/0326641 A1* 11/2017 Lee ..................... B22F 1/0096

FOREIGN PATENT DOCUMENTS

| CN | 104321291 A | 1/2015 |
|---|---|---|
| CN | 106977184 A | 7/2017 |
| TW | 564193 | 12/2003 |

* cited by examiner

*Primary Examiner* — Jessee R Roe
*Assistant Examiner* — Rebecca Janssen
(74) *Attorney, Agent, or Firm* — ScienBiziP, P.C.

(57) ABSTRACT

A method for manufacturing a powder injection molding feedstock includes providing a plurality of powder particles and a secondary binder and applying primary kneading in an internal mixer. The primary mixture is cooled and crushed. A main binder is provided and put into the internal mixer to mix with the mixture that being crushed for secondary kneading to obtain the powder injection molding feedstock. Glass-transition temperature of the secondary binder is greater than glass-transition temperature of the main binder. The secondary binder coats the powder particles. The main binder coats the secondary binder and the powder particles.

9 Claims, 1 Drawing Sheet

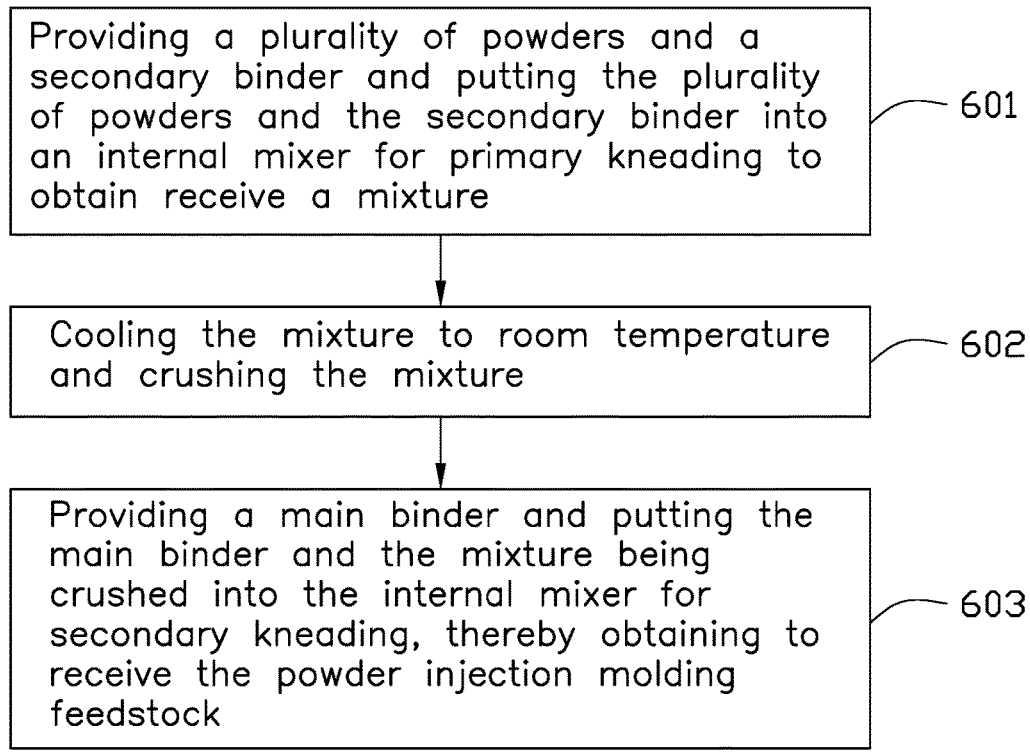

POWDER INJECTION MOLDING FEEDSTOCK AND METHOD FOR MANUFACTURING THE SAME

FIELD

The subject matter generally relates to a powder injection molding feedstock and a method for manufacturing the powder injection molding feedstock.

BACKGROUND

Metal injection molding (MIM) technology is a metalworking process by which finely metal powder particles are mixed with a binder material to form a feedstock which can be handled by an injection molding process. However, the feedstock has a complex shape which can cause the feedstock to be distorted or fracture during sintering. Improvement in the art is preferred.

BRIEF DESCRIPTION OF THE DRAWING

Implementations of the present disclosure will now be described, by way of example only, with reference to the attached FIGURE.

FIGURE is a flowchart of an exemplary embodiment of a method for manufacturing the powder injection molding feedstock of the present disclosure.

DETAILED DESCRIPTION OF EMBODIMENTS

It will be appreciated that for simplicity and clarity of illustration, where appropriate, reference numerals have been repeated among the different FIGURES to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to illustrate details and features of the present disclosure better.

The disclosure is illustrated by way of example and not by way of limitation in the FIGURES of the accompanying drawings, in which like references indicate similar elements. It should be noted that references to "an" or "one" embodiment in this disclosure are not necessarily to the same embodiment, and such references mean "at least one."

The term "comprising," when utilized, means "including, but not necessarily limited to"; it specifically indicates open-ended inclusion or membership in the so-described combination, group, series, and the like.

The present disclosure provides an exemplary embodiment of a powder injection molding feedstock. The powder injection molding feedstock includes powder particles, a secondary binder, a main binder, and an auxiliary agent.

The secondary binder coats the powder particles. The main binder coats the secondary binder and the powder particles. The auxiliary agent is dispersed in the main binder.

The powder particles have a volume percentage of about 55% to about 70% of a total volume of the powder injection molding feedstock. The secondary binder and the main binder have a volume percentage of about 30% to about 45% of the total volume of the powder injection molding feedstock. The secondary binder has a volume percentage of about 5% to about 20% of a total volume of the secondary binder and the main binder.

The powder particles can comprise metal powders or ceramic powders.

In at least one exemplary embodiment, the powder particles comprise metal powders. The metal powder particles can include copper, iron, silicon, tungsten, nickel, cobalt, chromium, molybdenum, and others.

In at least one exemplary embodiment, the powder particles have particle sizes at a micrometer range.

A glass-transition temperature of the secondary binder is greater than a glass-transition temperature of the main binder.

The secondary binder can be polymethyl methacrylate (PMMA) binder, polycarbonate (PC) binder, and others.

In at least one exemplary embodiment, the secondary binder is PC binder.

The main binder can be plastic-base binder, wax-base binder, or any combination thereof.

In at least one exemplary embodiment, the main binder is plastic-base binder. For example, the main binder is polyformaldehyde (POM) binder.

The auxiliary agent improves a bonding strength between the secondary binder and the main binder.

The auxiliary agent can be at least one of flow modifier, compatibility agent, and the like.

The flow modifier can be polypropylene flow modifier, polycarbonate/acrylonitrile butadiene styrene copolymers (PC/ABS) flow modifier, polyester flow modifier, high impact polystyrene flow modifier, and the like.

The compatibility agent can be cyclic anhydride compatibility agent, carboxylic acid type compatibility agent, epoxy type compatibility agent, oxazoline compatibility agent, imide compatibility agent, isocyanate compatibility agent, and the like.

FIGURE illustrates a flowchart of a method for manufacturing a powder injection molding feedstock. The method is provided by way of example, as there are a variety of ways to carry out the method. Each block shown in the FIGURE represents one or more processes, methods, or subroutines, carried out in the exemplary method. Furthermore, the illustrated order of blocks is by example only and the order of the blocks can change. Additional blocks may be added or fewer blocks may be utilized, without departing from this disclosure. The exemplary method can begin at block 601.

At block 601, a plurality of powder particles and a secondary binder are put into an internal mixer for primary kneading, thereby forming a mixture.

The powder particles can be metal powders or ceramic powders. In at least one exemplary embodiment, the powder particles are metal powders. The metal can include copper, iron, silicon, tungsten, nickel, cobalt, chromium, molybdenum, or others. In at least one exemplary embodiment, the powder particles have particle sizes at a micrometer range.

The secondary binder can be made of polymethyl methacrylate (PMMA) or polycarbonate (PC). In at least one exemplary embodiment, the secondary binder is made of PC.

The primary kneading is performed at a temperature which is greater than a glass-transition temperature of the secondary binder.

In at least one exemplary embodiment, the primary kneading is performed at a temperature greater than 250 degrees Celsius.

In at least one exemplary embodiment, the primary kneading is performed for a time period in a range of about 20 minutes to about 1 hour.

The mixture is substantially shaped into blocks when the mixture spurts out from the internal mixer.

The secondary binder coats the powder particles in the mixture.

At block 602, the mixture is cooled to room temperature and crushed.

The mixture can be crushed by mechanical crushing or a high pressure crushing.

In at least one exemplary embodiment, the mixture is crushed by mechanical crushing.

At block 603, a main binder and the mixture after being crushed are put into the internal mixer for secondary kneading to form the powder injection molding feedstock.

The main binder coats the secondary binder and the powder particles in the powder injection molding feedstock.

The glass-transition temperature of the secondary binder is greater than the glass-transition temperature of the main binder.

The powder particles have a volume percentage of about 55% to about 70% of a total volume of the powder injection molding feedstock. The secondary binder and the main binder have the volume percentage of about 30% to about 45% of a total volume of the powder injection molding feedstock. The secondary binder has a volume percentage of about 5% to about 20% with respect to a total volume of the secondary binder and the main binder.

The main binder can be a plastic-base binder, a wax-base binder, or any combination thereof.

In at least one exemplary embodiment, the main binder is plastic-base binder. For example, the main binder is polyformaldehyde (POM).

The secondary kneading is performed at a temperature which is greater than the glass-transition temperature of the main binder.

In at least one exemplary embodiment, the secondary kneading is performed for a time period in a range of about 20 min to about 1 hour.

Furthermore, an auxiliary agent can be put into the internal mixer to mix for the secondary kneading. The auxiliary agent is dispersed in the main binder.

The auxiliary agent can improve a bonding strength between the secondary binder and the main binder.

The auxiliary agent can be at least one of a flow modifying agent and a thickening agent.

The flow modifier can be polypropylene flow modifier, polycarbonate/acrylonitrile butadiene styrene copolymers (PC/ABS) flow modifier, polyester flow modifier, high impact polystyrene flow modifier, et cetera.

The compatibility agent can be cyclic anhydride compatibility agent, carboxylic acid type compatibility agent, epoxy type compatibility agent, oxazoline compatibility agent, imide compatibility agent, isocyanate compatibility agent, and the like.

Example 1

Metal powder particles, PC, and POM are provided. The volume percentages of metal powder particles, PC, and POM are in a ratio of about 60:35:5. The metal powder particles and the PC are put into an internal mixer for primary kneading under a temperature of about 265 degrees Celsius for about 40 minutes, thereby forming a mixture. The mixture is cooled to room temperature for about 25 minutes and crushed by mechanical grinding. The POM and the mixture after crushing are put into the internal mixer for secondary kneading under a temperature of about 190 degrees Celsius for about 1 hour, thereby forming a powder injection molding feedstock.

The powder injection molding feedstock is further treated by injection molding, catalytic degreasing, and sintering. During catalytic degreasing, the main binder (POM) is transformed to formaldehyde gas and dissipated to the ambient environment, thereby forming a number of pores in the powder injection molding feedstock. In the powder injection molding feedstock after injection molding, the powder particles are bonded together by the secondary binder (PC). During the early stage of sintering, since the glass transition temperature of the secondary binder (PC) is relatively high, so the secondary binder (PC) supports the powder injection molding feedstock after molding and enable the shape of the molding to be preserved. In the later stage of sintering, the secondary binder (PC) is removed from the powder injection molding feedstock.

With the above configuration, the powder injection molding feedstock comprises two kinds of binders with different glass transition temperature: a secondary binder and a main binder, and the glass-transition temperature of the secondary binder is greater than the glass-transition temperature of the main binder. 1) Under the high temperature and high pressure of injection molding, the secondary binder melts and adheres together again, thereby bonding the powder particles together to obtain the desired shape of the green body. Furthermore, in the early sintering, the powder injection molding feedstock can maintain a high bonding strength, so that the strength of the green body in the later stage sintering process can be maintained. 2) The primary kneading, crushing, and secondary kneading can obtain a good compatibility between the secondary binder and the main binder.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A method for manufacturing a powder injection molding feedstock, comprising:
   providing a plurality of powder particles and a secondary binder and putting the plurality of powder particles and the secondary binder into an internal mixer for primary kneading to obtain a mixture;
   cooling the mixture to room temperature and crushing the mixture; and
   providing a main binder, and putting the main binder and the mixture being crushed into the internal mixer for secondary kneading to form the powder injection molding feedstock;
   wherein a glass-transition temperature of the secondary binder is greater than a glass-transition temperature of the main binder, the secondary binder coats the powder particles, and wherein the main binder coats the secondary binder and the powder particles.

2. The method of claim 1, wherein the powder particles have a volume percentage of about 55% to about 70% of a total volume of the powder injection molding feedstock.

3. The method of claim 1, wherein the secondary binder and the main binder have a volume percentage of about 30% to about 45% of a total volume of the powder injection molding feedstock.

4. The method of claim 3, wherein the secondary binder has a volume percentage of about 5% to about 20% of a total volume of the secondary binder and the main binder.

5. The method of claim 1, wherein the primary kneading is performed at a temperature greater than the glass-transition temperature of the secondary binder.

6. The method of claim 5, wherein the primary kneading is performed at a temperature greater than 250 degrees Celsius.

7. The method of claim 1, wherein the primary kneading is performed for a time period in a range of about 20 minutes to about 1 hour.

8. The method of claim 1, wherein the secondary kneading is performed at a temperature which is greater than the glass-transition temperature of the main binder.

9. The method of claim 1, further comprising:
providing an auxiliary agent and putting the auxiliary agent into the internal mixer to mix for the secondary kneading, thereby causing the auxiliary agent to be dispersed in the main binder.

* * * * *